ELECTRONIC ANALOG RESOLVER

Filed July 12, 1965 4 Sheets-Sheet 1

Oct. 14, 1969 H. SCHMID 3,473,011

ELECTRONIC ANALOG RESOLVER

Filed July 12, 1965 4 Sheets-Sheet 3

United States Patent Office 3,473,011
Patented Oct. 14, 1969

3,473,011

ELECTRONIC ANALOG RESOLVER

Hermann Schmid, Binghamton, N.Y., assignor to General Electric Company, a corporation of New York

Filed July 12, 1965, Ser. No. 471,007
Int. Cl. G06g *7/26, 7/28;* G06f *15/34*
U.S. Cl. 235—197 6 Claims

ABSTRACT OF THE DISCLOSURE

An electronic resolver and function generator including two analog integrators in a loop with or without an inverter and with control and timing circuitry to either control or measure a period of time of oscillation as a means of inserting or removing a quantity associated with a function as for example an amount of vector rotation. Input and output include pulse width analog signals.

This invention is directed to a novel type of electronic analog resolver. The device selectively performs various operations including trigonometric function generation generally, coordinate transformation, and coordinate rotation. The device can also be readily adapted to perform additional operations such as the generation of hyperbolic functions.

An essential operation in analog computers which operate on vectors or with trigonometric relations is trigonometric function generation. For example, whenever two vectors (non-parallel and non-perpendicular) must be electronically added, at least one of the vectors must be transformed from the polar or R, $\theta$ form shown in FIGURE 1 to rectangular or $x$, $y$ components. Normally, the added vector components then have to be transformed back to the polar form. Both steps require trigonometric functions. While eleceromechanical devices have been in use for many years which perform coordinate transformation in a satisfactory manner for many applications, these devices are bulky, require substantial power, and have moving parts which invites reliability problems. Perhaps most important, electro-mechanical resolver devices are not readily compatible with solid-state integrated electronics.

The performance of resolver operations with present electronic analog computer apparatus has required the use of special apparatus to generate the trigonometric functions, etc. This has resulted in incurring relatively greater cost, more complexity, and higher failure rates in performing these operations than those incurred in performing other basic operations. Furthermore, present analog apparatus operates only over a range of $-\pi \leq \theta \leq \pi$. There is none which is unlimited in continuous range as shown in FIGURE 1A.

Accordingly, it is an object of the invention to provide electronic analog apparatus for coordinate transformations and rotations which has apparatus simplicity of the same level as other basic analog computer operation devices such as multipliers, etc.

It is another object of the invention to provide a simple electronic analog device for generating trigonometric functions over at least a continuous $2\pi$ range.

It is another object of the invention to provide a resolver which requires only fundamental electronic building block circuits such as integrators, comparators and switches.

It is another object of the invention to provide a resolver device which is compatible with several forms of signal modulation including pulse-width, analog voltage, and digital forms.

Briefly stated, in accordance with certain aspects of the invention, by treating the basic resolver functions as special cases of vector rotation, and by using time as an independent variable, a practical resolver computer The equation $\ddot{X}=-KX$ is solved by using a pair of analog for trigonometric function generation, etc., is obtained. integrators and an inverter in a loop, together with circuits for using time as an independent variable. Initial condition coordinates are read-in as initial D-C voltage settings on integrating capacitors. The loop is switched closed and vector rotation starts. Rotation is stopped when one of the coordinate functions reaches a zero level limit or the rotation time reaches a time limit proportional to a $\theta$ pulse-width input, according to choice. When rotation stops under zero level detection control, R and $\theta$ are respectively read-out from the other integrator final condition and the time for rotation. When rotation stops under input $\theta$ rotation time control, the components are read-out from the two integrators.

The invention, together with further objects and advantages thereof, may best be understood by referring to the following description taken in conjunction with the appended drawings in which like numerals indicate like parts and in which.

Figure 2:
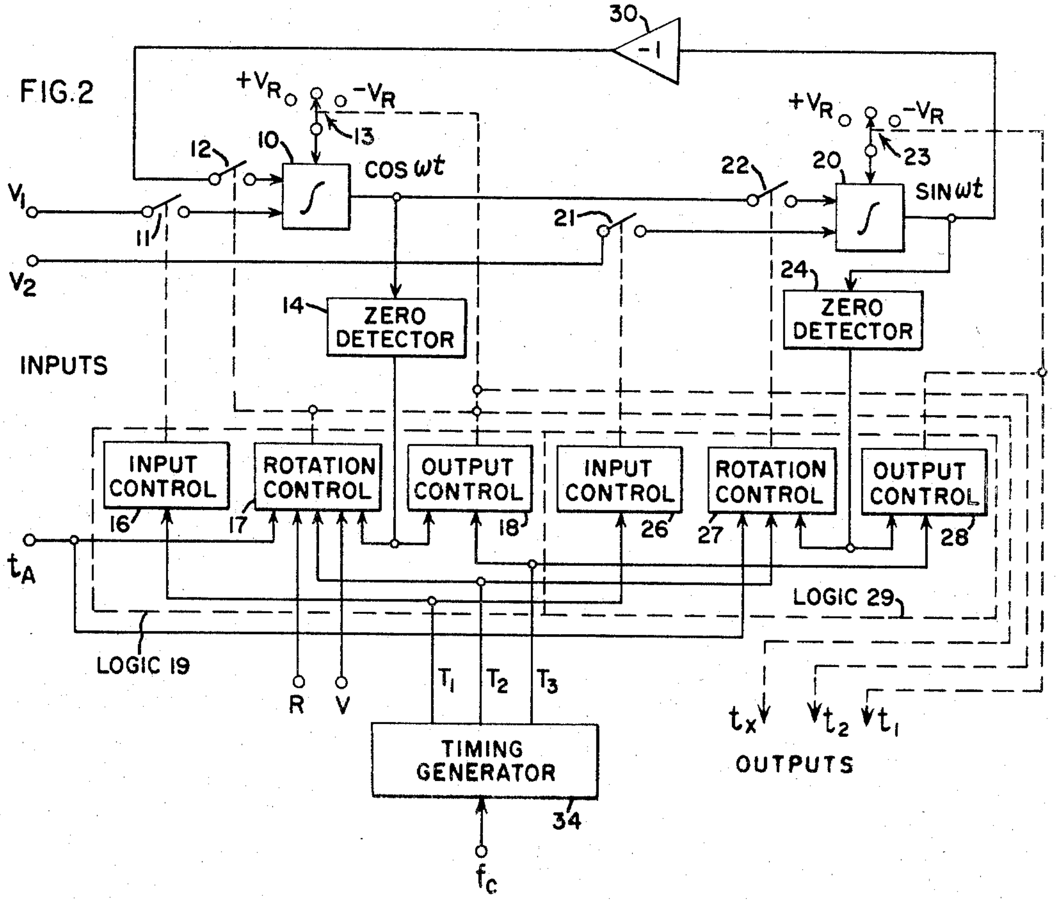
FIGURE 2 is a block diagram illustrating the basic arrangement of the electronic analog resolver invention.

The FIGURE 2 block diagram illustrates the basic invention. Input signals $V_1$ and $V_2$ set initial conditions and a third input $t_A$ is made available when direct coordinate rotation is performed. For example, for the coordinate transformation operation of rectangular to polar coordinate conversion $V_1$ and $V_2$ are D-C voltages proportional to the coordinate variables $x$ and $y$. (Conversely, with polar coordinates, the inputs are $V_1$ and $t_A$ for variables R and $\theta$ respectively.) Operations are normally performed cyclically in three successive periods: $T_1$, $T_2$ and $T_3$. First, input magnitude quantities are read-in to integrators 10 and 20 for $T_1$; second, the loop is closed to generate vector rotation for a time period proportional to the desired rotation within $T_2$; third, output magnitude quantities are read-out by sensing the final condition quantity values stored in the integrators during $T_3$.

Figure 3:
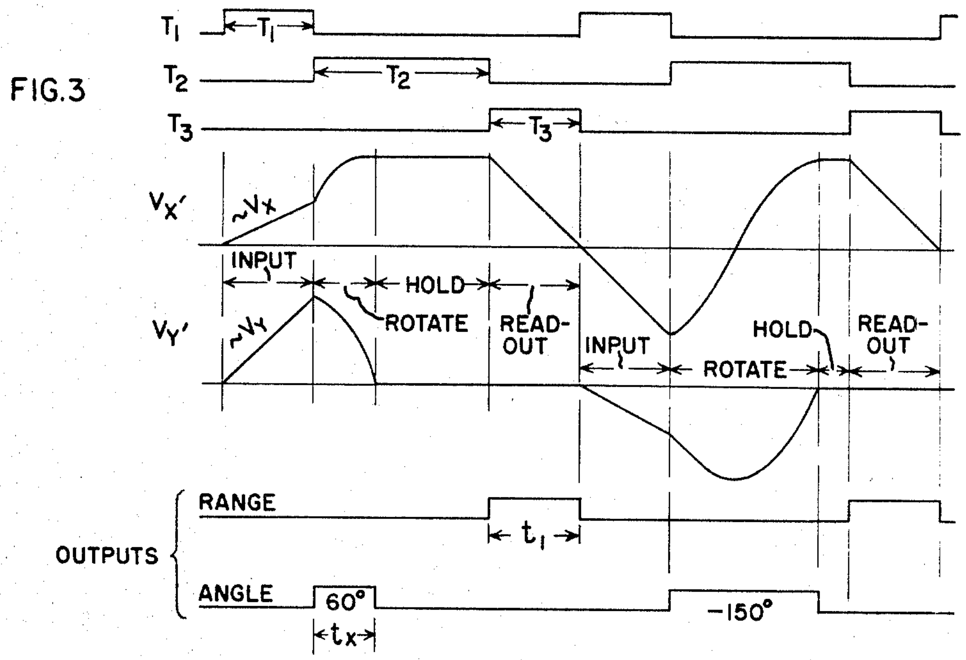
FIGURE 3 is a set of waveforms illustrating operation of the FIGURE 2 resolver for rectangular to polar coordinate conversion.

The operation of the FIGURE 2 resolver is illustrated by the FIGURE 3 timing diagrams for rectangular to polar coordinate conversion. The integrators 10 and 20 serve primarily as harmonic oscillation elements during the rotation period $T_2$ and serve as the primary modulator elements during the read-in period $T_1$ and read-out period $T_3$. In some respects, the integrators 10 and 20 perform two independent functions and are time-shared to make this possible. In the preferred embodiment, the basic independent operating variable is time $t$. During the read-in period $T_1$, logic 19 by means of input control 16 drives switch 11 closed, so that an input signal $V_1$ proportional to the input variable $x$ is applied to integrator 10 causing the integrator to operate to place a charge on its capacitor representing the integrating of the applied potential at any time and constituting the initial conditions for oscillation of the oscillator. The period $T_1$ is determined by a pulse from timing generator 34 in which the basic data processing clock pulse frequency $f_c$ is frequency divided, etc., to provide the $T_1$ pulse control. Because the time interval $T_1$ is a constant and the integrator 10 is a linear device, the necessary step of converting a signal representing $x$ to a rate signal which produces an integrated signal over $T_1$ normally involves only the selection of appropriate scale factor constants for integrator 10. At the same time that the input signal $x$ is read-in to integrator 10, switch 21 is closed by a drive signal from the input control 26 of logic 29 to permit the $y$ input signal to be read into integrator 20 from the $V_2$ terminal through switch 21. This permits the $xy$ inputs to be placed into the respective integrators independently.

During $T_2$, the integrators 10 and 20 and the inverter 30 are connected in a closed loop when switches 12 and 22 are closed by the rotation control sections 17 and 27 of logic 19 and 29, respectively. This closed loop inherently oscillates from the initial conditions imposed by the $x$ and $y$ values read-in during $T_1$. The equation solved by the FIGURE 2 device is:

$$X=-KX$$

With the basic relation for an electronic integrator using an operational amplifier $$V_{out}=-\frac{1}{RC}\int V_{in}dt$$

the output of inverter 30 is:

$$V_{\ddot{X}}=\frac{-K}{(R_{10}C_{10}R_{20}C_{20})}V_X$$

where K is the gain of inverter 30, $R_{10}$, $C_{10}$, $R_{20}$, $C_{20}$ are the resistances and capacitances of integrators 10 and 20 as indicated by the subscripts. For $R_{10}=R_{20}$, $C_{10}=C_{20}$, $K=1$, $M=(V_1^2+V_2^2)^{1/2}$, $\phi=\arctan(V_2/V_1)$, and the frequency $\omega=1/RC$, the equations are:

$$\dot{X}=M\sin(\omega t+\phi)$$

and $$X=\omega M\cos(\omega t+\phi)$$

Figure 1:
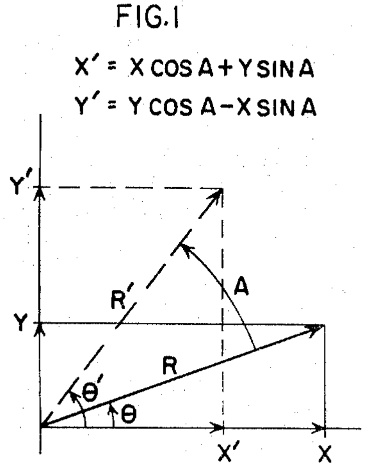
FIGURES 1 and 1A are respectively illustrations of coordinate rotation and trigonometric function waveforms.
Figure 1A:
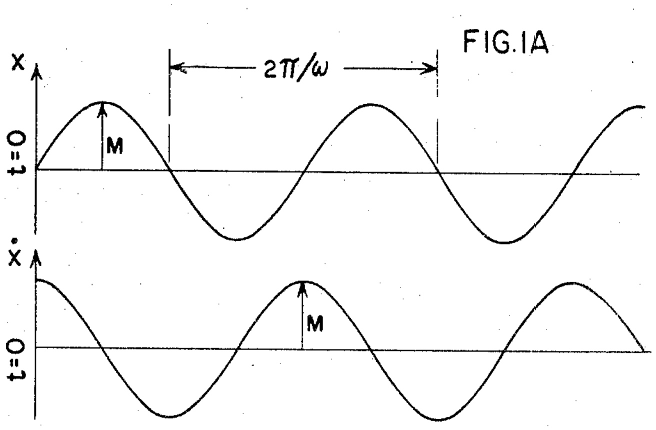

The frequency of the resulting sine and cosine waveforms, the same as in FIGURE 1A, are determined solely by the time constants of the integrators. The amplitude and relative phase of the waveforms are solely the functions of the initial condition voltages $V_1$ and $V_2$. The voltage across capacitor $C_{10}$ and the voltage across $C_{20}$, which are also the output voltages of integrators 10 and 20, can be regarded as the components of the vector $\overline{R}$. Rotation of this vector is achieved by closing the loop in the circuit of FIGURE 2 which changes $V_{C10}$ and $V_{C20}$ in a sinusoidal fashion. Since the sine and cosine waveforms are functions of time, rotation through a given angle A is achieved by closing the loop for a time interval $t_A$ the length of which is proportional to the angle A. The integrators 10 and 20 generate, respectively, $\dot{X}$ and X during $T_2$ when the rotation occurs. By initially inserting $x$ and $y$, the loop incorporates a vector quantity having the magnitude $|\overline{R}|=\sqrt{x^2+y^2}$ and an initial angle $\omega t_0=\arctan y/x$. By rotating this vector unit $\dot{X}=0$, the desired polar quantities are obtained because:

$|\overline{R}|=X$, if $\dot{X}=0$ and,
$\theta=\omega t$

Therefore, by timing the rotation during $T_2$ in which $\dot{X}$ changes from the initial X to zero, the polar coordinate $\theta=\arctan y/x$ is derived. The rotation control section 17 of the logic 19 utilizes zero detector 14 to sense the condition $\dot{X}=0$ and terminates rotation at that point. This provides the polar angle $\theta$ output in the form of a pulse-width signal $t_x$ formed by switching a reference voltage $V_R$ to the output. That is, rotation control section

17 drives switch 13 during $T_2$ for the particular rotation time $t=\theta/\omega$. As is well known, a pulse-width signal in addition to its utility as an analog variable signal, is readily converted to a D-C voltage signal or a digital signal, even while the original pulse-width signal is generated. For example, a digital signal is directly obtained by switching a source of clock pulses to a counter during the rotation.

For read-out, the polar coordinate $|\overline{R}|=X$ is derived from integrator 20 during $T_3$ by output control 28 which drives switch 23 closed during $T_3$ thereby producing a pulse-width signal $t_1$ having a duration proportional to $|\overline{R}|$. The output control 28 switches a reference voltage source to discharge integrator 20 with switch 23. The discharged condition $\dot{X}=0$ is sensed by zero detector 24 which terminates the output pulse-width signal. One feature of this procedure is that both integrators 10 and 20 are automatically reset to a neutral condition during $T_2$ and $T_3$ and generally no additional reset time is required before the next cycle commences, that is, $T_3$ and $T_1$ can be contiguous.

Figure 5:
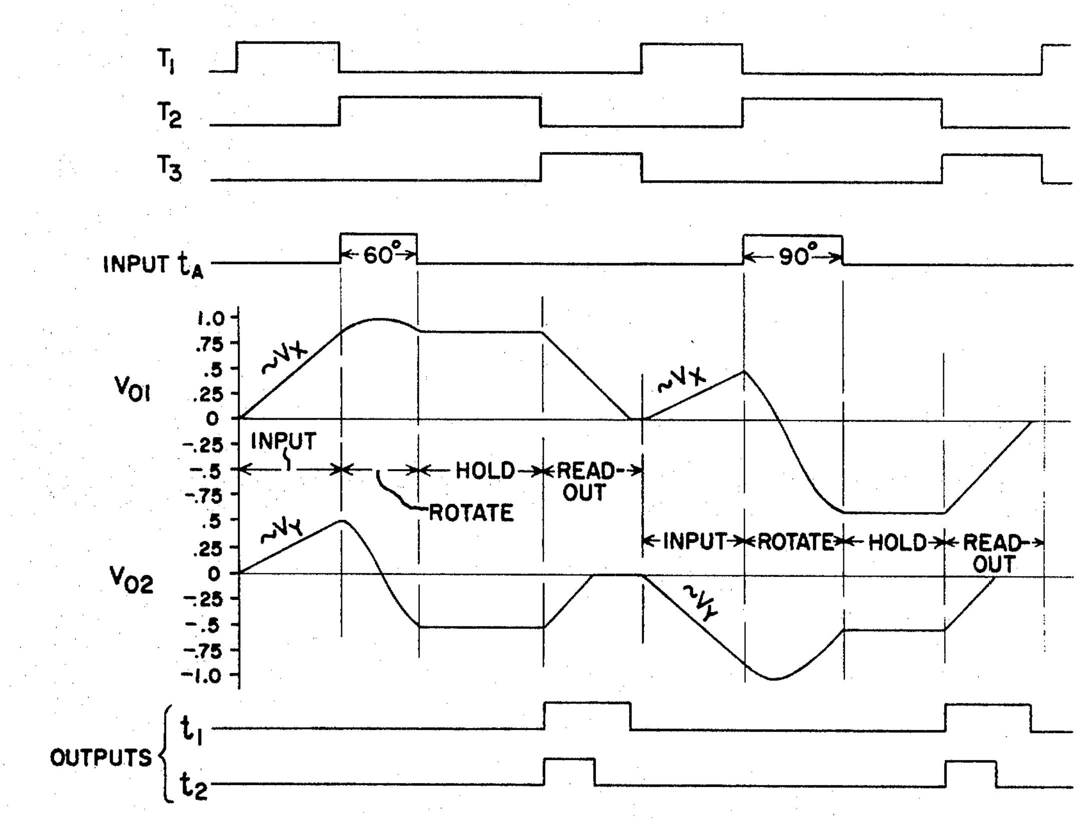
FIGURE 5 is a set of waveforms illustrating coordinate rotation operation of the FIGURE 2 resolver.

In the rotation operation the inputs to the resolver are the D-C voltages $V_1$ and $V_2$, the components of the *initial* vector $\overline{R}$, and the pulse-width signal $t_A$ representing the angle through which the vector must be rotated. The outputs from the resolver are $t_1$ and $t_2$ the components of the *rotated* vector. The resolver waveforms during a typical rotation operation are illustrated in FIGURE 5.

During $T_1$, input signals $V_1$ and $V_2$ are connected to the inputs of integrators 10 and 20 respectively. The voltage $V_{C10}$ across the integrating capacitor $C_{10}$ and the voltage $V_{C20}$ across the integrating capacitor $C_{20}$ increase with a slope proportional to $V_1$ and $V_2$ until the end of $T_1$ when they are $$V_{C_{10}}=\frac{T_1}{RC}V_1$$

and $$V_{C_{20}}=\frac{T_1}{RC}V_2$$

respectively: $V_{C10}$ and $V_{C20}$ are now the initial conditions for the differential equation, which will be solved in the next timing interval.

During $T_2$, the two integrators and the inverter are connected into a closed loop to solve the differential equation, or, in other words, to generate parts of a sine and a cosine waveform. The words resolve and vector rotation are used to describe this process.

Typical of the rotation operation is that the time duration of the resolve process is determined by the pulse-width input signal $t_A$. From the end of $t_A$ to the end of $T_2$ the values of $V_{C10}$ and $V_{C20}$ will remain constant since no inputs are connected to the integrators and since the resolver loop is not closed at this interval. The values of $V_{C10}$ and $V_{C20}$ are read-out during period $T_3$ by closing switches. This connects reference voltages with the appropriate polarities to the integrators to reduce $V_{C10}$ and $V_{C20}$ to zero. The time duration from the beginning of $T_3$ to the instant $V_{C10}$ and $V_{C20}$ crosses zero is:

$$t_1=K_{10}V_{C10}$$
$$t_2=K_{20}V_{C20}$$

where $K_{10}=K_{20}=RC/V_R$.

FIGURE 5 also illustrates how a vector $\overline{R}$ is rotated from the fourth quadrant (X is positive and Y is negative) through an angle of 90° to end up in the third quadrant.

In the two examples described, a clockwise rotation of the vector has been assumed. However, it is just as easy to achieve a counter-clockwise rotation by connecting the output of the inverter amplifier to the second zero detector instead of the output of the second integrator.

In FIGURE 3, the period $T_2$ has been made twice as long as $T_1$ or $T_3$. The reason for this is to accommodate rotation angles of 180 degrees. With the selection of the rotation direction, rotation through +180 degrees and −180 degrees, or a continuous 360 degrees can be accomplished.

Figure 4:
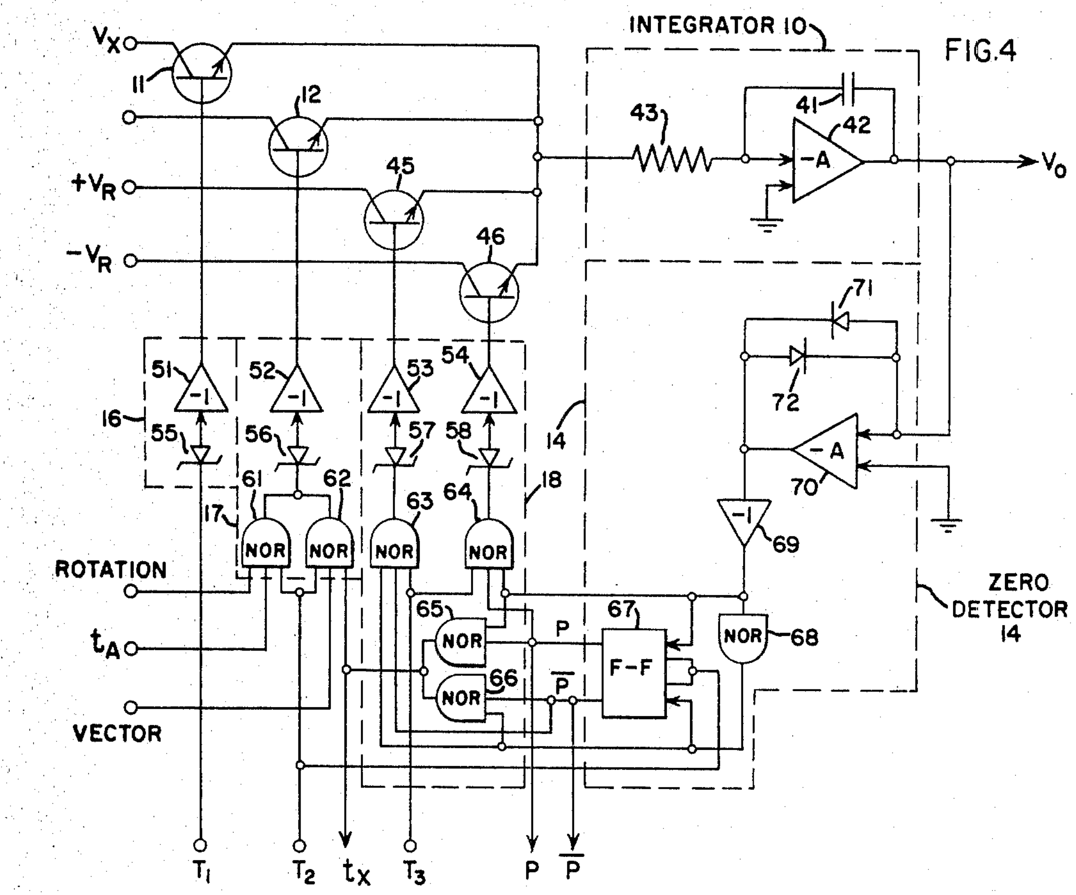
FIGURE 4 illustrates various details of a preferred embodiment of the FIGURE 2 resolver.

FIGURE 4 is a partially schematic diagram of a suitable form of implementation of the FIGURE 2 resolver illustrating the essential elements. The integrator 10 is a conventional analog computer type utilizing a capacitor 41, a D-C operational amplifier 42, and a summing resistor 43. Integrator 20 is identical with integrator 10 and the inverter 30 is similar, differing only by using a resistor as the feedback element instead of capacitor 41.

Standard quality switching transistors for analog signals are satisfactory as switches 11 and 12 for the $x$ input read-in and loop closing functions respectively. Switching transistors 45 and 46 determine whether plus or minus reference voltages are applied to integrator 10 during $T_3$ read-out in accordance with which quadrant $\theta$ is in. Preferably, the switching transistors are driven by conventional driver circuits which insure rapid positive switching. Zener diodes 55–58 are desirable for shifting the signal levels.

Except for this switching signal processing, switch 11 is directly operated by the $T_1$ pulses received by the input control section 16 of logic 19. The rotation control section 17 includes two NOR gates 61 and 62. Each of these logic gates is adapted to turn switching transistor 12 ON for a desired $\theta$ rotation. NOR gate 62 operates in a feedback mode, receiving a signal from zero detector 14 which controls the length of rotation. When this rectangular to polar coordinate mode is desired, a signal V is applied along with the $T_2$ signal to NOR gate 62. Conversely, when the rotation time is controlled by an input signal $t_A$, signals R, $t_A$ and $T_2$ operate NOR gate 61. For read-out by control section 18, NOR gates 63 and 64 operate in a manner similar to gates 61 and 62. The gates, in addition to the $T_3$ pulse, each receive two signals from zero detector 14. During the $T_2$ rotation, a memory device 67 generates a pair of complementary signals P, $\overline{P}$ which represent the polarity of $\dot{X}$ as controlled by the zero detector 14. Later, during the $T_3$ read-out, these polarity signals P, $\overline{P}$ select which polarity reference voltage switch 45 or 46 is selected. In order for the NOR gates 63 and 64 to terminate rotation, additional signals are derived from the zero detector 14 to drive the gate OFF at the zero crossing, thereby accurately producing the read-out $\dot{X}$ signal.

The zero detectors 14 and 24 are comprised basically of a conventional differential amplifier 70 and a pair of parallel, but oppositely poled, diodes 71 and 72 in a feedback connection. A pulse signal is produced by amplifier 70 whenever integrator 10 changes polarity. This signal is inverted and applied to a set-reset flip-flop 67 by means of driver 69 and NOR gate 68, which operates as an inverter.

Figure 7:
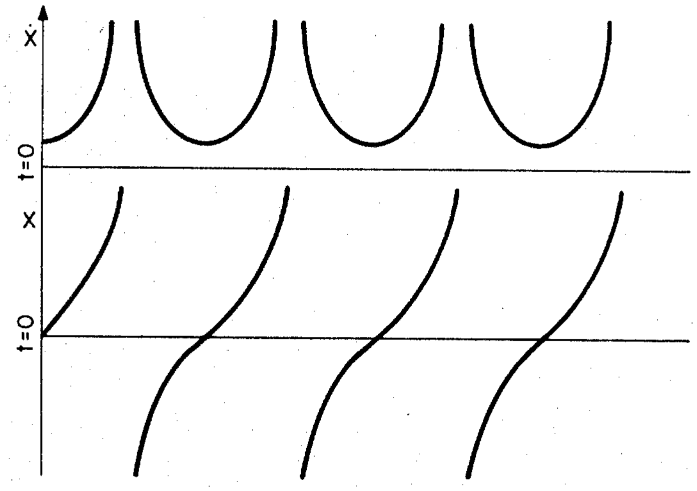
FIGURE 7 is an illustration of hyperbolic function waveforms.
Figure 6:
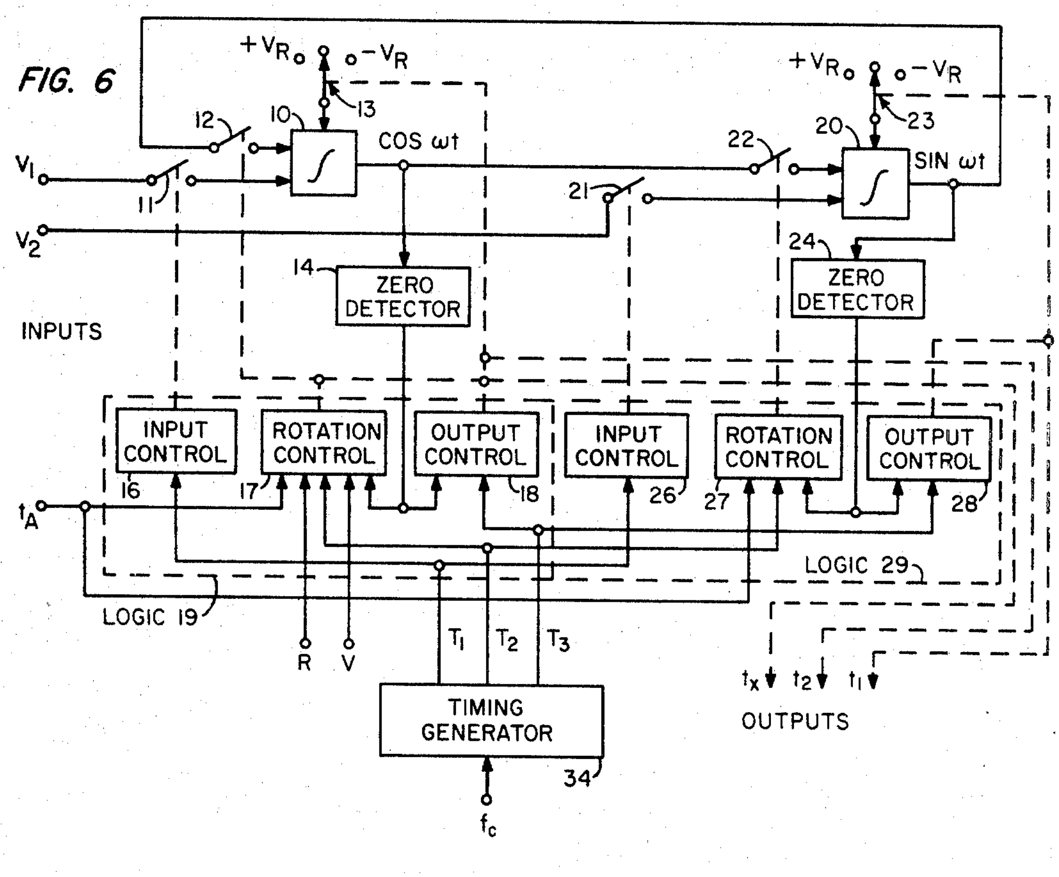
FIGURE 6 is a block diagram illustrating a modified arrangement of the electronic analog resolver invention for use in generating hyperbolic functions.

In order to generate hyperbolic functions, the only necessary modification is to remove inverter 30 so as to cause the structure to assume the configuration of FIGURE 6. The structure in this instance operates in the same manner as that described in FIGURE 2 with the single exception that the function generated is hyperbolic as caused by the fact of the hyperbolic oscillation illustrated in the wave forms of FIGURE 7. This results in a rotating vector having the magnitude, $$R=(X^2-Y^2)^{1/2},$$

and a phase angle, $A=\text{arc tanh }(Y/X)$.

In the embodiment shown and described, the salient feature is that a rotating vector is electronically generated which rotates at a constant angular velocity. The magnitude of the vector is a variable determined by the initial conditions read-in to respective integrator capacitors. The resulting voltages also determine the phase angle of the initial vector in the same way as orthogonal vector components determine a vector angle. With the appropriate RC time constants selected for the integrators, the constant vector rotation velocity is obtained which has the desired scale factor relation of time to rotation angle. The resulting final conditions are then read-out to produce signals representing output components. Generally, the time of vector rotation, which is proportional to an angle, is either an input or output quantity. When rotation angle time is not an input, the time of rotation is determined by detecting when the voltage signal across one of the integrating capacitors reaches a desired value. While this is usually zero, it can be some other value. The specific operations which can be performed by the resolver are therefore numerous and are essentially only limited by whether or not the specific operation can be described as a vector rotation. For example, if it is desired merely to generate sines and cosines, a reference unit level voltage is read-in to one integrator capacitor and zero voltage into the other integrator capacitor. The resulting initial vector has a unit magnitude and is then rotated for a time proportional to the variable angle. Then the final condition signals read-out of the integrator capacitors are the desired sine and cosine signals.

While particular embodiments of the invention have been shown and described herein, it is not intended that the invention be limited to such disclosure, but that changes and modifications can be made.

What is claimed is:

1. An electronic analog resolver comprising:
(a) a pair of electronic integrators;
(b) interconnecting circuit means connecting said integrators in a closed loop to form an oscillator which oscillates to produce a sinusoidal voltage having sine and cosine component functions of time representative of a vector rotating with a constant velocity;
(c) said integrators including signal storage means to receive, retain and make available initial conditions and a potential resulting from a period of oscillation; and
(d) timing means for stopping and starting said oscillator to create time periods of oscillation representative of particular amounts of rotation of said vector.

2. The electronic analog resolver of claim 1 wherein:
(e) said circuit means also includes an inverter to cause said oscillator to produce sine and cosine components of said voltage which are trigonometric.

3. The electronic analog resolver of claim 1 wherein:
(e) said circuit means are selected to cause said oscillator to produce sine and cosine components of said voltage which are hyperbolic.

4. An electronic device for generating trigonometric functions comprising:
(a) a pair of electronic integrators;
(b) circuit means coupled to said integrators providing a closed loop which generates solutions to the differential equation $X=-K\ddot{X}$;
(c) input means to read-in, to one of said integrators, an analog voltage signal representing one component of a vector;
(d) rotation control means for subsequently closing the loop for a time proportional to an angle of rotation of said vector, whereby potentials are generated in said integrators proportional to the sine and cosine of said angle of rotation;
(e) read-out means connected to said integrators creating signals proportional to said potentials in said integrators, wherein:
X is a mathematical variable,
−K is a constant,
$\ddot{X}$ is the second derivative of X.

5. An electronic analog resolver for coordinate rotation and transformation operations comprising:
(a) two analog integrators;
(b) a signal inverter;

(c) a series switch;
(d) connectors coupling said integrators, inverter, and switch in a closed loop to form a harmonic oscillator;
(e) each of said integrators having a capacitor across which a voltage appears representative of a vector component;
(f) read-in circuitry including switches connected to said integrators for introducing an initial charge to said integrators during a read-in period of time;
(g) a detector coupled to each said integrator for sensing when said voltage across the capacitor crosses a reference voltage value;
(h) output means including switches for reading-out the time during which said oscilaltor oscillates;
(i) timing means for cyclically controlling all said switches and sequentially creating read-in, rotation, and read-out periods of time in that order wherein said series switch is operated and said oscillator allowed to oscillate during said rotation period.

6. An electronic analog resolver for coordinate rotation and transformation operations comprising:
(a) two analog integrators;
(b) a signal inverter;
(c) a plurality of switches including read-in, loop closing and read-out switches;
(d) timing signal source means for cyclically controlling said switches to create sequential operational time periods of read-in, rotation, and read-out;
(e) input terminals for inserting analog signals representing initial conditions of components of a vector into said integrators through said read-in switches during said read-in period;
(f) connectors for coupling said integrators, inverter, and loop closing switches in a closed loop harmonic oscillator which will oscillate when said loop closing switches are closed during said rotation period;

(g) each of said integrators having a capacitor across which a sinusoidal voltage appears during oscillation of the oscillator;
(h) said sinusoidal voltages representing said components of said vector as it is rotated, whereby said oscillation is the equivalent of rotating said vector;
(i) a zero-crossing detector coupled to each of said integrators for sensing when said sinusoidal signal across the capacitor is zero;
(j) output means for read-out of the time during which said oscillator oscillates thereby producing a pulse-width signal proportional to the angle through which said vector is rotated.

References Cited

UNITED STATES PATENTS

| | | | |
|---|---|---|---|
| 2,995,302 | 8/1961 | Ingwerson et al. | 235—189 X |
| 3,028,504 | 4/1962 | Close | 235—186 X |

FOREIGN PATENTS 1,193,815 11/1959 France.

OTHER REFERENCES

Howe et al., "Trigonometric Resolution in Analog Computers by Means of Multiplier Elements," IRE Transactions on Electronic Computers, June 1957, pp. 86–91.

MALCOLM A. MORRISON, Primary Examiner

R. W. WEIG, Assistant Examiner

U.S. Cl. X.R.

235—186, 189